June 4, 1968 J. W. THOMSEN 3,386,675

DRIVEN WEB SUPPLY DETECTOR

Filed Oct. 21, 1965

Inventor:
Jack W. Thomsen.

By Barry L. Clark
John E. Peele Jr. Attys

United States Patent Office 3,386,675

Patented June 4, 1968

3,386,675

DRIVEN WEB SUPPLY DETECTOR

Jack W. Thomsen, La Grange Park, Ill., assignor to Bell & Howell Company, Chicago, Ill., a corporation of Illinois Filed Oct. 21, 1965, Ser. No. 499,876
14 Claims. (Cl. 242—55.13)

ABSTRACT OF THE DISCLOSURE

A web handling apparatus capable of alternatively handling a web material contained in a cartridge or on a reel. A drive is carried by the apparatus to drive the core of the cartridge to drive out the film end normally stored within the cartridge. A detector is carried by the apparatus to determine when the cartridge web supply is on the apparatus. Only when the detector detects a cartridge does it connect the drive to feed the film end from a cartridge. That is, the drive is not operated when a reel is supported on the apparatus.

This invention relates to a web handling apparatus which is capable of alternatively handling a web contained by a web supply either having a drivable means thereon or one not having a drivable means thereon, and particularly to a detector for sensing the presence of the drivable supply on the apparatus.

Although web handling machines such as motion picture projectors have been conventionally used with webs supplied on reels, there are many advantages in having the web loaded on the machine in a cartridge. To offer maximum utility, the machine should be usable with webs supplied in either manner. As a preferred form of such a web handling machine, the present invention will be related to a motion picture projector. In a combination cartridge and reel loading projector, film from a reel is manually placed into the projector threading channel and thus requires no forward drive. However, film from a cartridge must be power fed into the threading channel. Therefore, it is desirable to have a sensing means operably connected to the drive to disconnect the drive for the cartridge when the reel is used. Without a sensing means, film on a reel would be unwound and probably spilled therefrom if the projector is operated with the cartridge drive inadvertently left in driving condition following the projection of a cartridge of film, since the reel would be rotated before the operator could thread the film into the threading channel.

Thus, an object of the present invention is to provide a detector for sensing whether a web supply having drivable means thereon or a web supply not having a drivable means thereon is supported on an apparatus adapted to alternatively handle both.

Another object of the present invention is to provide, in an apparatus which is capable of alternatively handling a cartridge web supply and a reel web supply, a detector which senses the presence of a cartridge properly supported on the apparatus and engages a power source to feed the web from the cartridge.

A further object is to provide a motion picture projector with a detector which is operatively connected to maintain the film driving assembly inoperative during forward projector operation when a reel is supported on the projector.

In accordance with the novel aspects of the present invention, a cartridge projector, which is adapted to alternatively support a reel, is provided with a detector located on the projector housing to be actuated when a cartridge is positioned on the housing. Actuation of the detector by a cartridge causes certain power transfer assemblies within the housing to be operatively connected to a powered drive to power a core of a cartridge positioned on the projector. In the preferred embodiment, the power transfer asemblies and the core are operative during forward projector functions to initially feed film from the cartridge. During reverse projector functions, other power transfer assemblies forming no part of the present invention, cause return of the film onto the reel or into the cartridge, and are preferably not affected by the presence or absence of a cartridge.

To initially feed the film from the substantially closed cartridge when it is on the projector, a film feed disk extending from the projector housing engages the film in the cartridge through an access opening in the cartridge casing to drive the leading end of the film in the cartridge about the casing interior toward a film exit opening, also in the casing. The disk is powered when the cartridge core is powered during forward projector functions. The film end is urged out of the exit opening by a simultaneously powered stripper roller which partially enters the exit opening.

These and other objects of the present invention will become more apparent from the following description when read with the accompanying drawings in which.

Figures 1, 2, 3, 4, 5, 6:
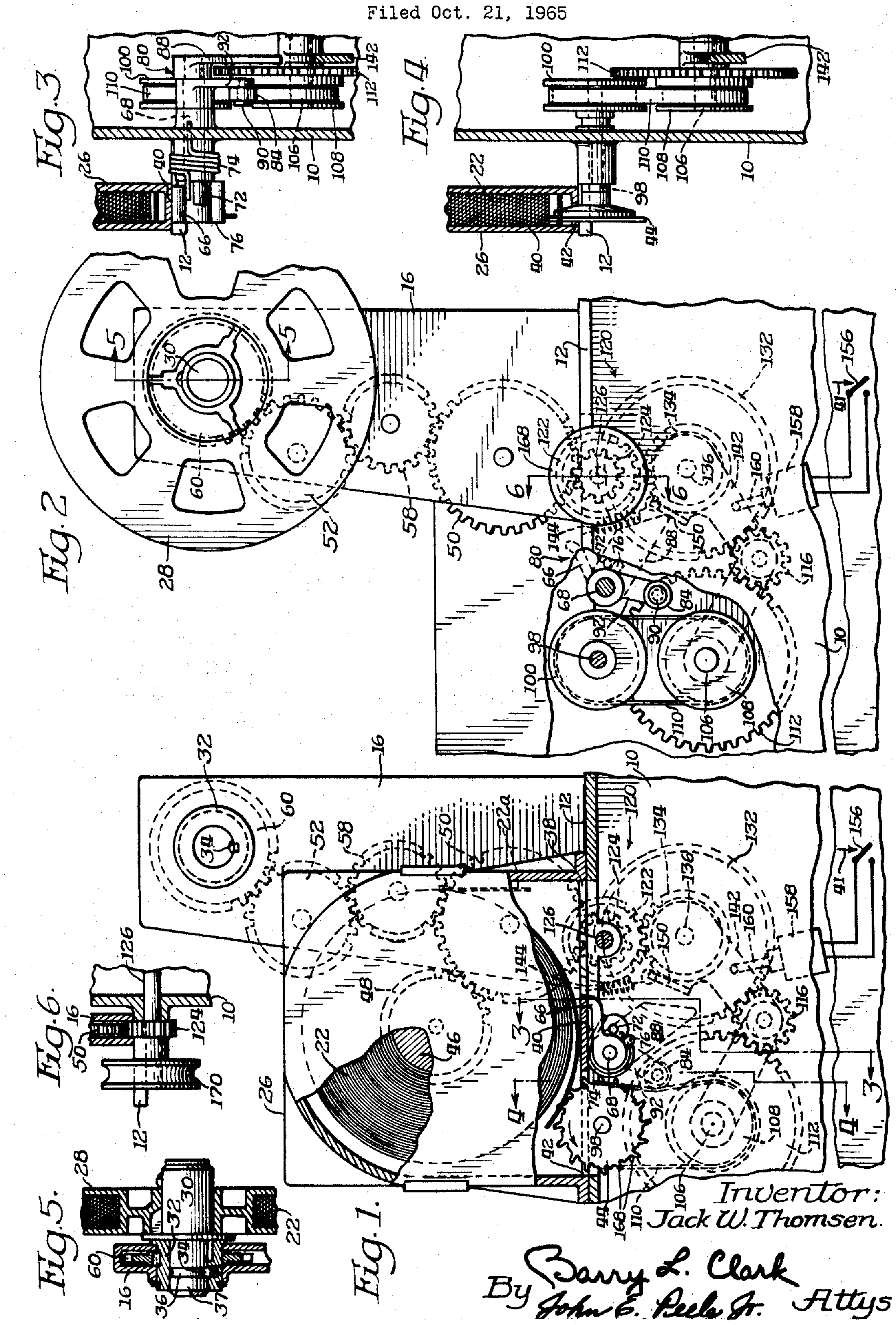
FIG. 1 is a view, in partial section, of the cartridge detector and related components mounted on a projector with a cartridge properly positioned to supply film to the projector.
FIG. 2 is a similar view, in partial section, with a reel supported to supply film to the projector, the film being omitted for clarity.
FIG. 3 is a section view taken along line 3—3 of FIG. 1.
FIG. 4 is a view taken along section line 4—4 of FIG. 1.
FIG. 5 is a detailed view of a reel supporting spindle in a receiver, taken along lines 5—5 of FIG. 2.
FIG. 6 is a detailed view of a stripper roller, taken along line 6—6 of FIG. 2.

Disclosed in the drawings is a portion of a web handling apparatus, such as a projector, having a housing 10 including a support plate 12 from which a film supply mounting structure 16 extends upwardly. An elongated, perforated web, such as film 22, is supplied to the projector from either a cartridge 26 (FIG. 1) or a reel 28 (FIG. 2), which may be alternatively supported on mounting structure 16. Although reel 28 is normally not driven during forward projector operations, such as regular projection, it must be supported on a spindle 30 which can be powered to enable rewind of the film onto the reel when projection is completed. However, when a cartridge larger than that shown in FIG. 1 is mounted on the mounting structure, the spindle would be in the way. Thus, spindle 30 (FIG. 5) is made completely removable from mounting structure 16. To secure spindle 30 against inadvertent removal, the structure is provided with a spindle receiver, such as sleeve 32. Into the interior of sleeve 32 protrudes a biased detent member, such as a ball 34, which is adapted to engage a groove 36 in the reduced portion 37 of the spindle, so that the spindle is releasably retained.

Referring now to FIG. 1, a cartridge 26 containing film 22 is seen mounted on structure 16. The film is fed from the cartridge through a film exit opening 38 in a cartridge wall portion 40. The exit opening 38 is aligned with a threading channel entrance (not shown) in support plate 12 of the projector through which the film is fed along a guide path, symbolically indicated by arrow 41, to conventional projector parts, such as a shuttle mechanism (not shown). Adjacent exit opening 38 in the cartridge is an access opening 42 through which film in the substantially closed cartridge is engaged by a powered film feed disk 44. The disk drives the film clockwise around the inner periphery of the cartridge toward exit opening 38.

In cartridge 26, film 22 is wound in concentric convolutions about a core 46 mounted for rotational movement by a drivable means, such as core gear 48. When a cartridge is properly seated on mounting structure 16, core gear 48 is in mesh with a driving member, such as gear 50, which is rotatably supported on the structure. Driving gear 50 is powered by a hereinafter described transmission assembly, during predetermined periods of time. As shown, movement of core gear 48 is clockwise when film is to be fed into the projector during forward projector functions, and counterclockwise for reverse projector functions, such as reverse projection or for rewind of the film into the cartridge.

As seen in FIGS. 2 and 5, drive to a reel 28, when it is supported on spindle 30, which is inserted in spindle receiver 32, is through another drive member, such as gear 60. Spindle drive gear 60 is driven through idler gears 52, 58 only during reverse projector functions since driving of the reel during forward projector functions might cause film to unwind and spill before it could be manually inserted into the threading channel. The film supply driving assembly, including gears 50, 52, 58 and 60, is powered during reverse functions (by a means not shown) for both the cartridge and the reel, since both are taking up film.

To obtain the desired selective operation of driving gear 50 only when a cartridge is present and the projector is running in a forward direction, a means 66 to detect the presence or absence of a cartridge, that is a film supply having drivable means thereon, is provided. This detecting means or detector 66 is shown as pivotably movable although it might be an essentially stationary member or a member completely enclosed within a part of the projector at a position to be actuated either by a cooperating element on the cartridge or the cartridge casing per se, but not by a film supply not having a drivable means thereon, such as a reel. Mounting of a cartridge on structure 16 causes one cartridge wall portion 40 to engage and move detector 66 from its normal spring biased position in FIG. 2 to an actuated position in FIG. 1. Detector 66 is fixed to a shaft 68, which extends through housing 10. When cartridge 26 is removed from the projector, a resilient means, such as coiled spring 74 (see FIGS. 1 and 3), returns detector 66 to the normal position (as seen in FIG. 2) wherein integral lug 76 abuts a stop pin 72 fixed to the housing. On the internal end of shaft 68 are mounted a tensioner roller 84 and a transmission control member, such as a deflector arm 88. Roller 84 is mounted for free rotation about a rod 90 fixed to a support member 92, which is connected to shaft 68. Extending through housing 10 adjacent to and substantially parallel with shaft 68 is a freely rotatable shaft 98 on the interior end of which is fixedly mounted a driven pulley 100.

As seen in FIGS. 1 and 2, a prime drive means, which might be a reversible motor but is disclosed in this embodiment as a drive shaft 106 powered through conventional means by a reversible motor (not shown), is spaced from and parallel with the driven shaft 98. A drive pulley 108 is fixed to the end of drive shaft 106 so as to be located essentially in a plane with the driven pulley 100. A coupler belt 110, connects pulleys 100 and 108 but only transmits the motion of pulley 108 to pulley 100 when tensioner roller 84 is in engagement therewith.

On drive shaft 106 is fixed a gear 112 which is meshed with an idler gear 116 from which power is transmitted to a power transmission assembly 120 which includes a pair of power output gears 122, 124 on a stationary or fixedly positioned, rotatable shaft 126. Output gear 124 is in mesh with the driving member 50 to transmit power to the driving assembly supported on mounting structure 16. Another portion of transmission assembly 120 is formed as a pair of power input gears 132, 134 which are fixed on a rotatable shaft 136 that is supported on a plate 142 adjacent one end thereof. A spring member 144 connected between housing 10 and the plate urges the plate rotatably about an axis aligned with shaft 106 to cause engagement of input gear 134 with output gear 122. The idler gear 116 is supported on the plate in continuous engagement between gears 112 and the other input gear 132 so as to transmit power to gear 134 regardless of the angular position of the plate. Engagement of the input and output portions of the transmission assembly 120 occurs when a cartridge is present on the mounting structure causing the detector 66 to be rotated so as to move deflector arm 88 out of a path of a flat 150 which is formed substantially at right angles to the body of the plate 142. Absence of a cartridge permits the spring 74, acting on detector 66, to rotate the detector and arm 88 into their normal positions so that the deflector arm 88 is lodged against flat 150 restraining the input gear 134 out of engagement with output gear 122. Thus, when a cartridge actuates detector 66, film 22 is driven from the cartridge as the transmission assembly 120 is actuated to a power transferring condition. If a reel is on the projector, the detector 66 is not actuated and power is not transferred through the transmission assembly.

In the projector, preferably beyond the projection axis (not shown), but adjacent film path 41, is located a sensor 156 operatively connected to an actuator, such as solenoid 158. The solenoid has a moving element or plunger 160 which is operatively connected to support plate 142 to move the plate between its normal and actuated positions depending upon the condition of the sensor 156. When film reaches sensor 156, solenoid 158 is actuated and the plate 142 is moved to terminate the transfer of power by the transmission assembly so that the film is fed for projection in the usual manner. After projection, when film 22 is rewound and sensor 156 is cleared, solenoid 158 is deactivated thus conditioning the projector to handle a subsequent film. Thus, it is understood that the film supply drive is operative only during the initial portion of the forward projection operations when film is being fed from the cartridge. Because the sensor and solenoid act to move the plate in only one direction and the transmission assembly is operable only when a cartridge is present, the threading and projection of film from a reel is not affected when the sensor is actuated by that film.

Although not shown in the drawings, the detector might also be a micro-switch or other generally stationary sensor directly connected in circuit with solenoid 158 to activate the solenoid upon location of the cartridge on the projector. Through such a circuit, which will be understood by those skilled in the art, switch 156 would be actuated by the presence of film 22 in guide path 41 to deactivate the solenoid and the transmission assemblies in the manner as previously described. Operation of tensioner roller 84 and deflector arm 88 through a linkage or other means connected so that they will be properly moved when the moving member 160 of the solenoid is operated will also be readily appreciated by those skilled in the art.

Since the end of film 22 in cartridge 26 must be moved out of exit opening 38 to be fed into the projector, the film feed disk 44 (see FIGS. 1 and 4) is mounted on the shaft 98, which is driven when detector 66 actuates coupler 110. Disk 44, formed as a modified sprocket wheel, has a plurality of teeth 168 which engage in the perforations of the outermost convolution of the film within the cartridge housing 40. Since the disk and the cartridge core 46 are powered simultaneously, when the outer film convolutions are unwrapped by rotation of the core, clockwise as shown, the disk urges the film end around the generally circular cartridge interior toward the film exit opening 38.

Movement of the film out of exit opening 38 is encouraged by a stripper roller 170, which is mounted on shaft 126 so as to partially enter the opening 38, when the cartridge is on the projector. The roller has a friction creating surface, such as rubber, which will effectively direct the film 22, and particularly the lead end **22*a* (as shown in FIG. 1, about to be fed from the cartridge), out of exit opening 38** and into the film threading channel of the projector.

When spindle 30 is in the receiver 32 (as seen in FIGS. 2 and 5) with a reel 28 located thereon, the leading end of the film 22 is manually or otherwise inserted into the threading channel of the projector. Detector 66 remains in its normal position causing deflector arm 88 to remain engaged against flat 150 and the tensioner roller 84 to remain out of engagement with coupler 110 so that no power is transferred by either transmission assembly 120 or coupler 110.

Although, from the above description, the operation will be appreciated by those skilled in the art, it will be summarized in this paragraph. The cartridge detector 66 is positioned on the projector housing such that it will be actuated when a cartridge is located on the mounting structure. Actuation of the detector causes the film supply driving assembly, the film feed disk, and the stripper roller to be powered, during forward projector functions by operatively connecting each to a powered drive of the projector. If a reel is supported on the mounting structure, the detector will not be actuated and the aforenamed components will not be powered.

While the invention has been particularly described with reference to particular embodiments thereof, it is to be understood that modifications and variations may be effected without departing from the scope of the invention.

I claim:

1. In a web handling apparatus having a housing for alternatively supporting a web supply having a drivable means thereon, and a web supply not having a drivable means, the combination comprising:

driving means on said housing adapted to drive a web supply having drivable means thereon and supported on the housing;

powered drive means in said housing to selectively power said driving means;

means detecting the presence of a web supply having drivable means thereon on said housing; and means connecting said detecting means and said drive means to power said driving means when a drivable web supply is detected, said drive means remaining disconnected from said driving means when a web supply not having a drivable means is supported on said housing.

2. The apparatus of claim 1 wherein said web supply having drivable means thereon is a cartridge, and said detecting means is mounted in the path of said cartridge for movement from a normal position to an actuated position when said cartridge is on said housing.

3. The apparatus of claim 2 which includes a means to resiliently urge said detecting means to the normal position when said cartridge is removed from said housing.

4. The apparatus of claim 1 including a power transfer means intermediate said powered drive means and driving means, said power transfer means comprising:

a stationary power transmitting member in operative engagement with said driving means and a movable power transmitting member in operative engagement with said powered means;

said movable member being adapted to be selectively moved into operative engagement with said stationary member when said detecting means detects a web supply having drivable means wherein power is transferred through said stationary member to said driving means.

5. The apparatus of claim 4 including a biasing means to urge said movable power transmitting member into driving engagement with said stationary member;

means operably connected with said detecting means to move said movable power transmitting member against the urging of said biasing means when said detecting means detects a drivable web supply on said housing.

6. The apparatus of claim 1 wherein said drivable web supply is a film containing cartridge including wall portions defining an exit opening, and said apparatus includes a stripper roller in operable relation with said driving means to move film through said exit opening when said roller is powered and engages the film in said cartridge.

7. The apparatus of claim 1 including a web guide path through said housing, and sensor means adjacent said guide path to sense the presence of a web in said guide path and cause said driving means to terminate operation when a web is sensed.

8. In a web handling apparatus having a housing including a guide path therethrough, the combination comprising:

mounting means on said housing for alternatively supporting a cartridge containing a web and a reel containing a web;

driving means on said mounting means to selectively feed a web from a cartridge when said cartridge is supported on said mounting means;

a detector located on said housing to be actuated when a cartridge is on said mounting means and to remain non-actuated when a reel is supported on said mounting means;

powered drive means in said housing;

power transfer means to selectively connect said powered drive means in power transferring relationship with said driving means;

means operatively connecting said power transfer means and said detector to actuate said power transfer means into power transferring relationship when said detector is actuated; and sensor means adjacent said guide path to cause disconnection of said powered drive means from power transferring relationship with said driving means when said sensor means is actuated by presence of a web in said guide path.

9. In a motion picture projection apparatus for projecting film supplied on a reel, or in a cartridge having wall portions defining an exit opening and an access opening, the invention comprising:

a housing for alternatively supporting the reel and the cartridge;

driving means on said housing to selectively drive a core of a cartridge when said cartridge is positioned on said housing;

a powered drive member within said housing;

a driven member within said housing;

a coupling to selectively connect said drive member to transmit power to said driven member;

a film feed means on said driven member positioned to enter said access opening in said cartridge to feed film in said cartridge toward said exit opening when said cartridge is on said housing;

a transmission to selectively connect said driven member to transmit power to said driving means;

means mounted on said housing to be actuated upon detecting said cartridge on said housing; and means responsive to actuation of said detector to selectively connect said coupling and said transmission in power transmitting relationship whereby said film feed means is powered to drive film toward said exit opening, and said transmission is powered to drive said cartridge core to feed film from said cartridge when said cartridge is on said housing.

10. The apparatus of claim 9 wherein said transmission includes a stationary power transmitting member in operative engagement with said driving means, and a movable power transmitting member in operative engagement with said powered drive member;

said movable member being adapted to be selectively moved into operative engagement with said stationary member wherein power is transferred through said stationary member to said driving means.

11. The apparatus of claim 9 wherein said detecting means is mounted in the path of said cartridge for movement between a normal position and an actuated position;

said detecting means being adapted to be moved to said actuated position by said cartridge when said cartridge is on said housing.

12. The apparatus of claim 9 which includes a stripper roller in operative relation with said driving means to move film through said exit opening when said roller is powered and engages film in said cartridge when said cartridge is on said housing.

13. The apparatus of claim 9 including a guide path through said projector housing; and sensor means adjacent said guide path to disconnect said powered drive means from power transferring relationship with said driving means when said sensor means is actuated by presence of a film in said guide path.

14. In a motion picture projection apparatus for projecting film supplied on a reel, or in a cartridge having wall portions defining an exit opening and an access opening, the combination comprising:

a housing on which the reel and the cartridge are alternatively supported;

driving means on said housing to selectively drive a core of a cartridge when said cartridge is positioned on said housing;

a powered drive member within said housing;

a driven member within said housing;

a coupling to selectively connect said drive member to transmit power to said driven member;

a film feed means on said driven member positioned to enter said access opening in said cartridge to feed film toward said exit opening when said cartridge is on said housing;

a transmission to selectively connect said driven member to transmit power to said driving means;

said transmission including a stationary power transmitting member in operative engagement with said driving means; and a movable power transmitting member in operative engagement with said powered drive member;

a detector mounted on said housing for actuation by the presence of said cartridge on said projector; and means responsive to actuation of said detector to selectively connect said coupling and said movable member of said transmission in power transmitting positions whereby said film feed means is powered to drive film toward said exit opening and said transmission is powered to drive said cartridge core to feed film from said cartridge when said cartridge is on said housing.

References Cited

UNITED STATES PATENTS 3,149,797 9/1964 Pastor et al. ________ 242—55.13

LEONARD D. CHRISTIAN, *Primary Examiner.*